United States Patent
Vats et al.

(10) Patent No.: US 11,258,604 B2
(45) Date of Patent: Feb. 22, 2022

(54) REWIRING CRYPTOGRAPHIC KEY MANAGEMENT SYSTEM SERVICE INSTANCES

(71) Applicant: Oracle International Corporation, Redwood Shores, CA (US)

(72) Inventors: Kanika Vats, Bengaluru (IN); Elangovan Subramanian, Redwood Shores, CA (US); Madhu Manjunath, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 168 days.

(21) Appl. No.: 16/558,625

(22) Filed: Sep. 3, 2019

(65) Prior Publication Data

US 2020/0127823 A1    Apr. 23, 2020

(30) Foreign Application Priority Data

Oct. 19, 2018    (IN) .............................. 201841039629

(51) Int. Cl.
  *H04L 9/08*    (2006.01)
(52) U.S. Cl.
  CPC .......... *H04L 9/0891* (2013.01); *H04L 9/0877* (2013.01); *H04L 9/0897* (2013.01)
(58) Field of Classification Search
  CPC ............................ H04L 9/0891; H04L 9/0877
  See application file for complete search history.

(56) References Cited

U.S. PATENT DOCUMENTS

| | | | |
|---|---|---|---|
| 8,601,263 B1 | 12/2013 | Shankar et al. | |
| 8,782,441 B1 | 7/2014 | Osterwalder et al. | |
| 8,914,632 B1 | 12/2014 | Shankar et al. | |
| 9,667,416 B1 * | 5/2017 | Machani | H04L 63/06 |
| 9,716,696 B2 * | 7/2017 | Narayan | H04L 9/0897 |
| 9,887,836 B1 * | 2/2018 | Roth | H04L 9/0822 |
| 10,211,977 B1 * | 2/2019 | Roth | H04L 9/3234 |
| 10,243,739 B1 * | 3/2019 | Brandwine | H04L 9/0643 |
| 10,581,820 B2 * | 3/2020 | Keshava | H04L 9/0894 |
| 10,623,186 B1 * | 4/2020 | Mehr | H04L 9/3226 |
| 10,623,386 B1 * | 4/2020 | Bernat | H04L 9/0822 |
| 10,693,638 B1 * | 6/2020 | Cignetti | H04L 9/3247 |
| 10,747,529 B2 * | 8/2020 | Yuki | G06F 11/14 |

(Continued)

FOREIGN PATENT DOCUMENTS

| | | |
|---|---|---|
| EP | 3376387 A1 | 9/2018 |
| EP | 3376687 A1 | 9/2018 |

OTHER PUBLICATIONS

International Search Report and Written Opinion issued in the International Application No. PCT/US2019/032434, dated Dec. 22, 2020.

(Continued)

*Primary Examiner* — Viral S Lakhia
(74) *Attorney, Agent, or Firm* — Potomac Law Group, PLLC

(57) ABSTRACT

Embodiments are directed to rewiring a key management system ("KMS") service instance ("SI") with associated keys. Embodiments, in response to a request, delete a first SI that is mapped to one or more keys. To restore the keys, embodiments create a second SI and map the second SI to the one or more keys.

20 Claims, 10 Drawing Sheets

(56) References Cited

U.S. PATENT DOCUMENTS

| | | | |
|---|---|---|---|
| 10,803,451 B2* | 10/2020 | Peikert | G06Q 20/1235 |
| 10,922,132 B1* | 2/2021 | Shiramshetti | H04L 9/0894 |
| 10,979,403 B1 | 4/2021 | Mutescu et al. | |
| 11,075,753 B2* | 7/2021 | Angel | H04L 9/0637 |
| 2012/0011360 A1 | 1/2012 | Engels et al. | |
| 2014/0019753 A1 | 1/2014 | Lowry et al. | |
| 2016/0112387 A1 | 4/2016 | Cignetti et al. | |
| 2016/0241389 A1 | 8/2016 | Saint et al. | |
| 2018/0316676 A1* | 11/2018 | Gilpin | H04L 9/0891 |
| 2018/0337914 A1* | 11/2018 | Mohamad Abdul | H04L 9/12 |
| 2019/0229899 A1 | 7/2019 | Roth | |
| 2019/0318102 A1* | 10/2019 | Araya | H04L 9/0822 |
| 2019/0342079 A1* | 11/2019 | Rudzitis | H04L 63/06 |

OTHER PUBLICATIONS

Jones et al., RFC7516—JSON Web Encryption (JWE) [online] IETF, May 2015 [retrieved Nov. 7, 2020]. Retrieved from the internet: URL: https://tools.eitf.org/html/rfc7516 (Year 2015).

Pardon et al., "Consistent Disaster Recovery for Microservices: the BAC Theorem", IEEE Cloud Computing, IEEE, USA, vol. 5, No. 1, Jan. 1, 2018, pp. 49-59.

\* cited by examiner

Master Keys

+ Add

| Alias | Key | Status | Date |
|---|---|---|---|
| ROOT_MEK | 3d84d9b27410994bc3b4ab724d8c0598dc6 | ● | May 10, 2019 6:28:30 PM |
| test_mek | 6932846901?da447dab1a804420164c? | ● | Mar 21, 2019 4:11:15 AM |
| test_mek_3921 | 2439a558d95243ad0b395 1a8683c85174 | ● | Mar 26, 2019 3:07:30 AM |
| test_Mek_new | 4cc879c4c73b4098ad34ecbd??c2e94 | ● | May 2, 2019 11:58:06 PM |

Page 1 of 1 (1-4 of 4 items)

REWIRING CRYPTOGRAPHIC KEY MANAGEMENT SYSTEM SERVICE INSTANCES

FIELD

One embodiment is directed generally to a computer system, and in particular to the management of cryptographic keys in a computer system.

BACKGROUND INFORMATION

A key management service ("KMS") provides for the management of cryptographic keys in a cryptosystem. Management includes the functions of the generation, exchange, storage, use, crypto-shredding (i.e., destruction) and replacement of keys. It includes cryptographic protocol design, key servers, user procedures, and other relevant protocols.

The keys in a KMS are logical entities that represent one or more key versions that contain the cryptographic material used to encrypt and decrypt data, protecting the data where it is stored. When processed as part of an encryption algorithm, a key specifies how to transform plaintext into ciphertext during encryption and how to transform ciphertext into plaintext during decryption. A KMS in general recognizes two types of encryption keys: a master encryption key ("MEK") and a data encryption key ("DEK"). After a user has created a master encryption key using the KMS, the user can then use an application programming interface ("API") to generate data encryption keys that the KMS returns to the user. A KMS returns a raw key and a wrapped key. Typically, the user will only store the wrapped key.

SUMMARY

Embodiments are directed to rewiring a key management system ("KMS") service instance ("SI") with associated keys. Embodiments, in response to a request, delete a first SI that is mapped to one or more keys. To restore the keys, embodiments create a second SI and map the second SI to the one or more keys.

BRIEF DESCRIPTION OF THE DRAWINGS

FIG. 9 is a screenshot of an SI Management Console that allows a user to manage keys in accordance to embodiments.

FIG. 10 is a screenshot of a PSM UI for creating or deleting a new service instance in accordance to embodiments.

DETAILED DESCRIPTION

One embodiment is a key management service ("KMS") in which a deletion of a service instance and corresponding access to an MEK can be restored by a user/customer of the KMS. A new service instance is created, and the new service instance is mapped to the "deleted" MEK.

Figure 1:
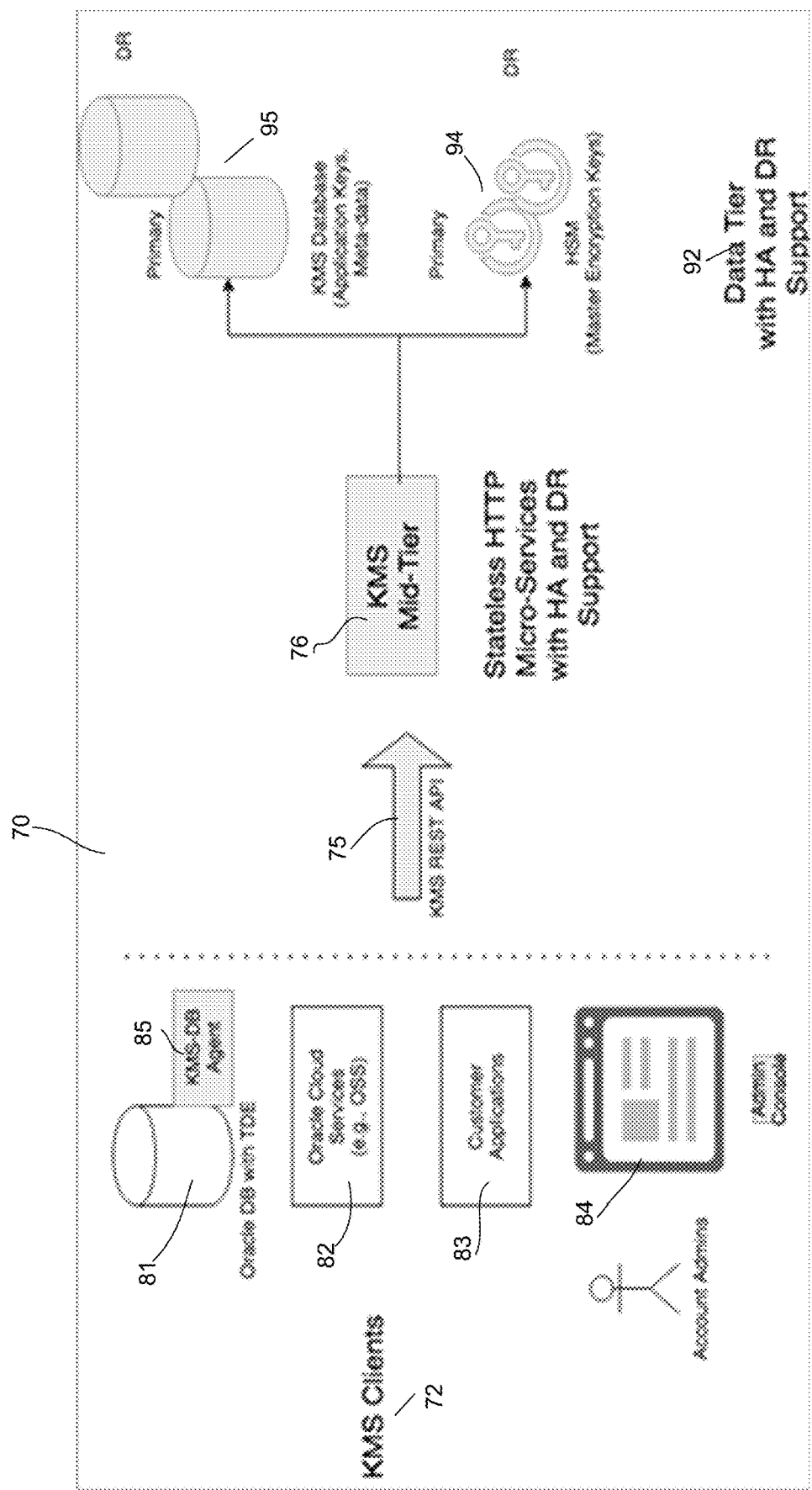
FIG. 1 illustrates a high level overview of a key management service in accordance to embodiments of the invention.

FIG. 1 illustrates a high level overview of a KMS 70 in accordance to embodiments of the invention. A plurality of KMS clients 72 request keys using a representational state transfer ("REST") application program interface ("API") from one or more web servers 76. Clients 72 that can request and utilize keys include a database 81. In one embodiments, database 81 is a database from Oracle Corp. that includes Transparent Data Encryption ("TDE") that enables the encryption of sensitive data that is stored in tables and tablespaces. After the data is encrypted, this data is transparently decrypted for authorized users or applications when they access this data. In this embodiment, database 81 includes a KMS-DB agent 85. Other requesting clients 72 can include various cloud services 82 in a cloud environment, various customer applications 83, or an administrative console 84 that is operated by an account administrator, also referred to as a user or customer of an overall cloud system that includes the KMS shown in FIG. 1.

In one embodiment, one or more web servers 76 are cloud based servers. In embodiments, web servers 76 are implemented by a mid-tier component 76 which exposes a REST API 75 based-upon system for cross-domain identity management ("SCIM"). In one embodiment, mid-tier 76 includes of a set of stateless microservices which communicate with a data tier 92.

In one embodiment, a microservice that can implement mid-tier 76 is an independently deployable service. In one embodiment, the term "microservice" contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an Hypertext Transfer Protocol ("HTTP") resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, a microservices architecture such as mid-tier 76 refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional HTTP port) and that allows any other module/microservice within the same service to talk to it. A microservice or any other self-contained functional module can be generically referred to as a "service".

Data tier 92 includes hardware security modules ("HSMs") 94 and databases 95. An HSM is a physical computing device that safeguards and manages digital keys for strong authentication and provides crypto processing. These modules traditionally come in the form of a plug-in card or an external device that attaches directly to a computer or network server. MEKs are resident within HSMs 94 and HSMs 94 to provide crypto-services that involve MEKs. Application keys and all metadata are stored within database 95. All components of mid-tier 76 and data tier 92 are implemented with high availability ("HA") and disaster recovery ("DR") in some embodiments.

In one embodiment, database 95 is implemented with the relational database management system ("RDMS") database from Oracle Corp. In the context of Oracle databases, a schema object is a logical data storage structure. An Oracle database associates a separate schema with each database user. A schema comprises a collection of schema objects. Examples of schema objects include: tables, views, sequences, synonyms, indexes, clusters, database links, snapshots, procedures, functions or packages. On the other hand, non-schema objects may include: users, roles, contexts or directory objects Schema objects do not have a one-to-one correspondence to physical files on disk that store their information. However, Oracle databases store schema objects logically within a tablespace of the database. The data of each object is physically contained in one or more of the tablespace's data files. For some objects (such as tables, indexes, and clusters) a database administrator can specify how much disk space the Oracle RDBMS allocates for the object within the tablespace's data files. There is no necessary relationship between schemas and tablespaces: a tablespace can contain objects from different schemas, and the objects for a single schema can reside in different tablespaces.

In one embodiment, mid-tier 76 and data tier 92 are implemented by authentication services that are provided by an Identity Cloud Service ("IDCS") that is a multi-tenant, cloud-scale, identity access management ("IAM") platform from Oracle Corp. IDCS provides authentication, authorization, auditing and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across a variety of services/applications/systems. Users and clients must first authenticate to IDCS and obtain tokens that are suitable for KMS access. Perimeter authorization is enforced by IDCS Cloud Gate. Fine-grained access to KMS APIs is enforced by an authorization module with appropriate scopes and roles used to distinguish between clients and administrators. Additional details of IDCS are disclosed, for example, in U.S. Pat. No. 9,838,376, the disclosure of which is hereby incorporated by reference.

In embodiments, the KMS supports horizontal partitioning for SIs. Therefore, each SI is associated with a dedicated schema created across more than one DB instance. A primordial DB is the central DB that contains information on which SI schema resides in which DB instance as well as login details. It also persists SI to tenant mapping.

Figure 2:
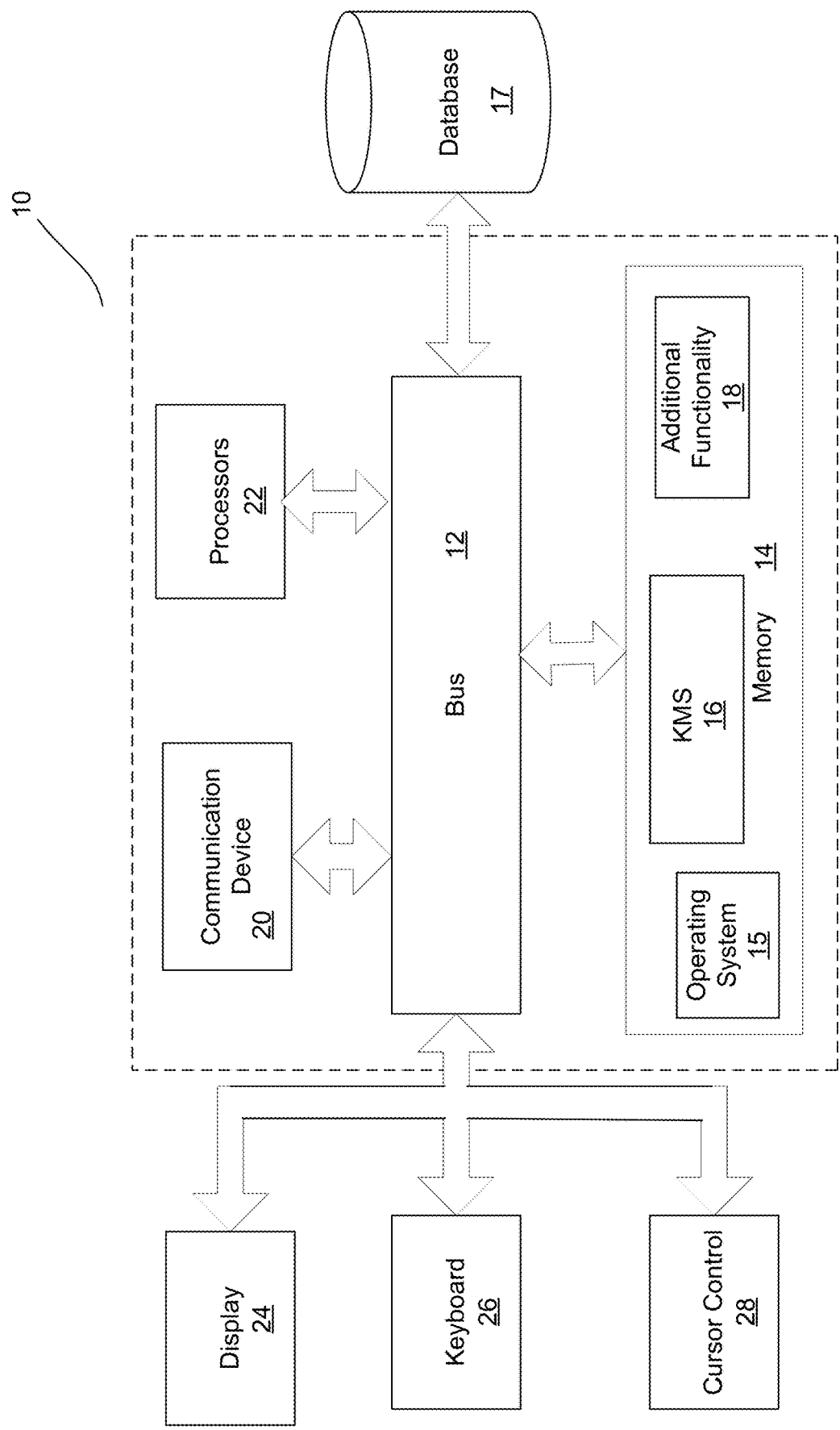
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 2, such as a keyboard or display. All or portions of system 10 may be used to implement any or all of the components shown in FIG. 1 in some embodiments.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a KMS module 16 that provides KMS functionality, and all other functionality disclosed herein. System 10 can be part of a larger system. Therefore, system 10 can include one or more additional functional modules 18 to include the additional functionality, such as IDCS functionality disclosed above. A database 17 is coupled to bus 12 to provide centralized storage for modules 16 and 18 and store keys, passwords, etc. In one embodiment, database 17 is a relational database management system ("RDBMS") that can use Structured Query Language ("SQL") to manage the stored data.

As previously discussed, keys (i.e., an "MEK") created by a user in a KMS play an imperative role since they are used for encrypting all of the user's sensitive data. Keys are stored in a hardware based persistent store in the form of a datastore or database schema, such as HSM 94 of FIG. 1. As long as the user's data is encrypted, there is a need for the user to not lose the key since access to the encrypted data would no longer be available. In the Oracle Public Cloud ("OPC") a user can create multiple KMS instances for their cloud account. A service instance is an API that allows a customer to access the keys. When a SI is created, a new SI Uniform Resource Locator ("URL") is generated and this URL will function as an SI management console UI from which the user can manage keys.

However, some KMSs allow a user to delete an MEK. For example, in the KMS from Oracle Corp., keys can be deleted. However, before the key is deleted, the KMS provides the following warning: "When you set a key to the Pending Deletion state, anything encrypted by that key immediately becomes inaccessible. The key also cannot be assigned or unassigned to any resources or otherwise updated. When the key is deleted, all key material and metadata is irreversibly destroyed. Before you delete a key, either assign a new key to resources currently encrypted by the key or preserve your data another way. If you want to restore use of a key before it is permanently deleted, you can cancel its deletion."

However, in case of accidental deletion of a user's service instance ("SI"), the user will face major consequences that will leave their encrypted data undecipherable. Therefore, in general, a regular KMS SI deletion is not allowed unless the user previously deletes every MEK created. In some known systems, the only way to delete the service instance with MEKs present is by opting for a "Force Delete." This can be initiated by a customer administrator gesture or as part of a Cloud Account Deletion via login to the PSM UI using admin console 84.

Figure 3:
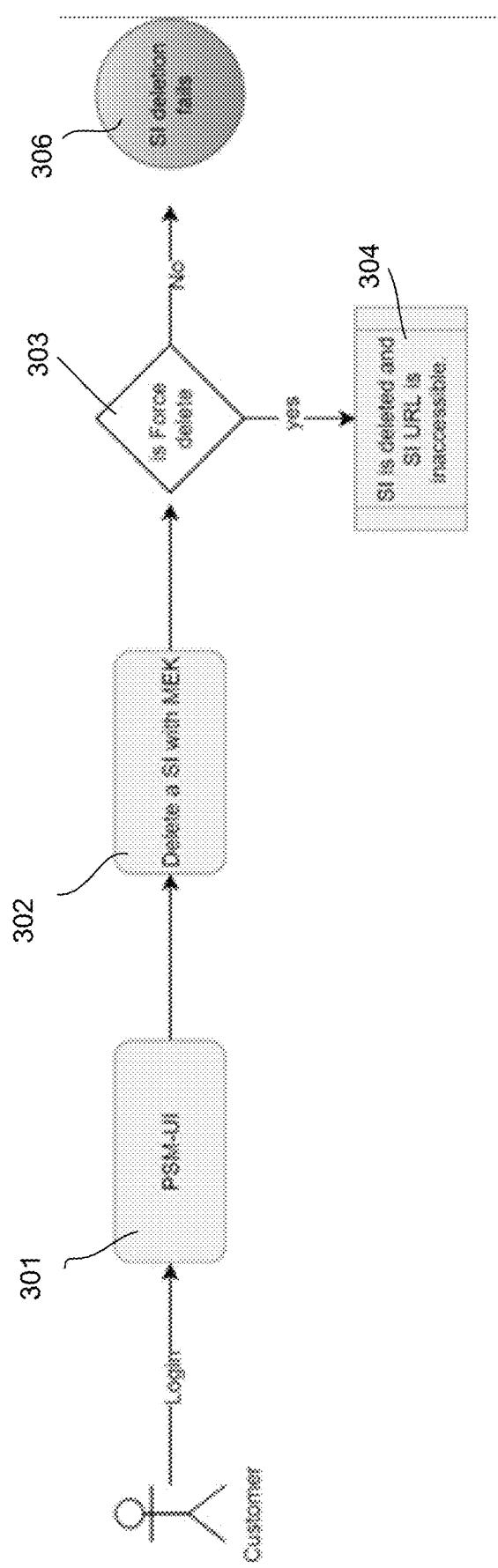
FIG. 3 is a flow diagram of functionality for a user/customer to delete a service instance in accordance with an embodiment.

FIG. 3 is a flow diagram of functionality for a user/customer to delete a service instance in accordance with an embodiment. In embodiments, the functionality of FIG. 3 is implemented by KMS module 16 of FIG. 2 or by mid-tier 76 and data tier 92 of FIG. 1. In one embodiment, the functionality of the flow diagram of FIG. 3 (and FIGS. 4 and 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 3 is for the known Oracle KMS. For the disclosed functionality, in embodiments it is assumed that both the KMS primordial DB and service instance DB will be running.

At 301, the user/customer logs into a PaaS Service Manager Tool ("PSM") user interface ("UI") or uses a PSM Rest API. The PSM provides a command line interface ("CLI") which allows the user to manage the lifecycle of various platform services in the Oracle Cloud. The CLI is a thin wrapper over PaaS REST APIs that invokes these APIs to support common PaaS features, including creating and managing instances for Oracle Java Cloud Service, Oracle Database Cloud Service instances, and Oracle MySQL Cloud Service or creating and managing applications with Oracle Application Container Cloud Service. The CLI also supports the Oracle Cloud Stack Manager, a PaaS tool that automates the provisioning and deletion of cloud environments. Admin console 84 can be used in embodiments to access the PSM UI.

In embodiments, another service instance specific console referred to a "KMS Console" allows a service administrator to manage and operate on keys. The PSM Admin Console 84 provides SI URL links that takes a user from the PSM Admin Console to the KMS Console. The PSM Admin console is for managing multiple KMS service instances for a Tenant/Customer, while the KMS Console allows management of only keys for one service instance.

At 302, the user indicates the deletion of the SI with one or more corresponding MEKs. The MEKs do not first have to be deleted in embodiments. At 303, a prompt is generated for the user to verify that the user desires a force deletion of the SI. If the user responds with a "No", at 306 the SI deletion fails. Otherwise, at 304, the SI is deleted and the corresponding SI Uniform Resource Locator ("URL") is inaccessible. As discussed above, the deletion of the SI also means that the user no longer has access to any corresponding stored MEKs. However, in some circumstances, a user will "accidently" delete their SI, despite the warnings disclosed above.

As a result of the functionality of FIG. 3, after the user deletes their KMS SI through, for example, the PSM UI or PSM Rest API, they will not be able to access the SIs HSM keys or access the KMS console to query against the DB Schema mapped to the deleted Service Instance. As part of the Delete operation of the SI in some embodiments:

The SI status will be marked as SOFT_TERMINATED in a SERVICE_INSTANCE database table of KMS database 95 (FIG. 1);

A DB SCHEMA MAP table's row corresponding to the deleted Service Instance will be marked as STALE;

The DB Schema for the deleted KMS Service Instance as well as the HSM keys will be retained for 30 days before complete purging happens.

Therefore, in embodiments, functionality is provided for the user to get back access to their KMS Service Instance KMS Key artifacts for the deleted KMS service instance (from the functionality of FIG. 3 in embodiments) within a 30 day time period (or another predefined time period) because the actual MEKs are not deleted until after the predefined time period. As disclosed below, the user creates a new KMS SI and the deleted KMS Service Instance's DB Schema is rewired to the newly created KMS SI.

Embodiments are directed to a rewiring automation framework that enables a user to regain access to keys and therefore re-instantiate Key Management Operations post-force service instance deletion. This framework associates old keys of the deleted service instance with the new service instance. It should be executed within only a fixed number of days post deletion after which keys gets permanently deleted from HSM and there is no way to recover these keys back (e.g., 30 days).

Figure 4:
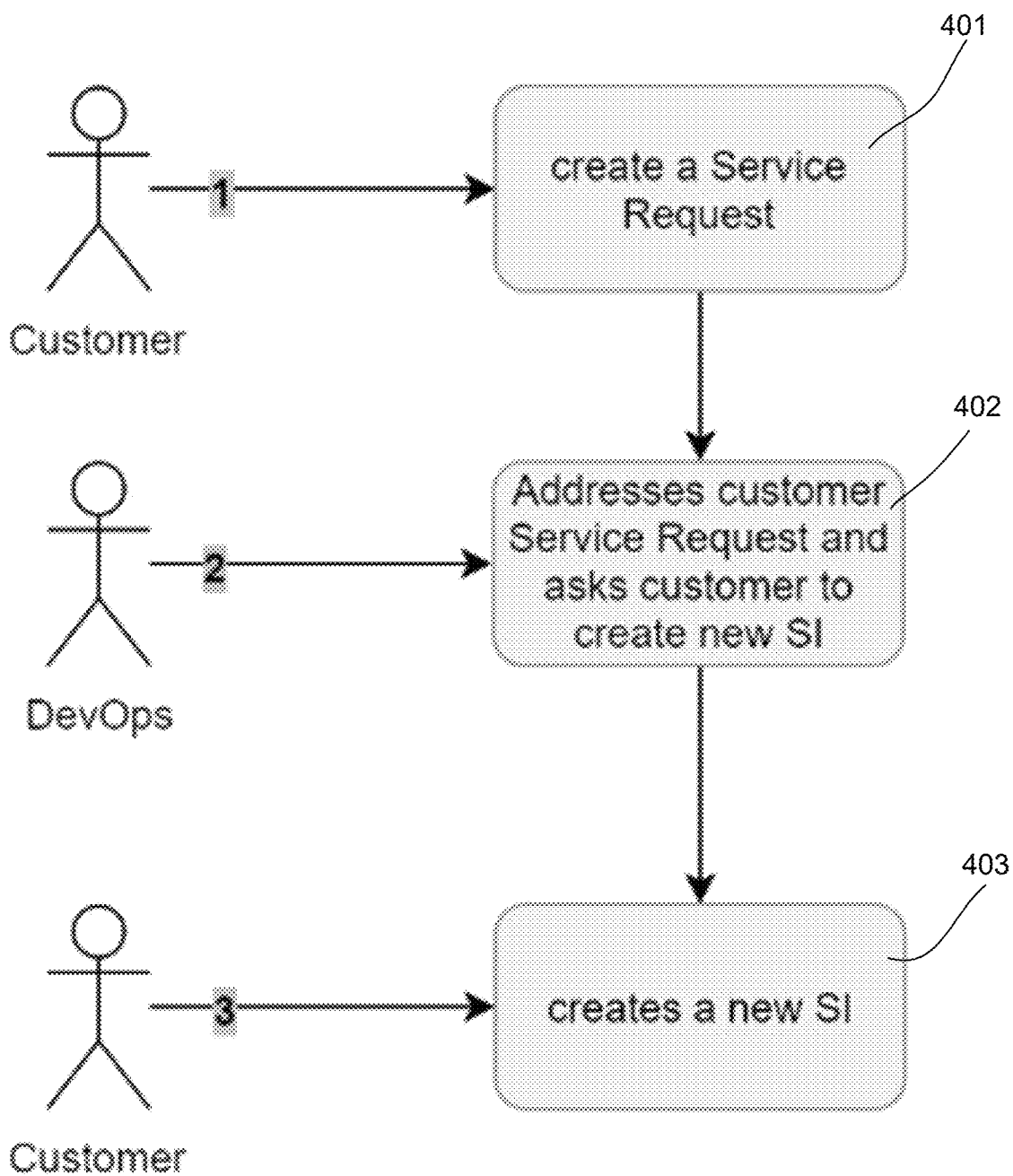
FIG. 4 is a flow diagram of functionality for a user/customer to restore a deleted service instance in accordance with an embodiment.

FIG. 4 is a flow diagram of functionality for a user/customer to restore a deleted SI in accordance with an embodiment. In embodiments, the functionality of FIG. 4 is implemented by KMS module 16 of FIG. 2 or by mid-tier 76 and data tier 92 of FIG. 1. The functionality of FIG. 4 would occur after the functionality of FIG. 3 in embodiments.

At 401, the user creates a service request ("SR") to restore the deleted MEK(s). At 402, a development and operations ("devOps") engineer, which could be an operational team engineer, addresses the SR and asks the user to create a new SI. In embodiments, the additional option is exposed in the PSM Admin Console so that whenever a user creates a new SI, they can choose to create a fresh schema in the backend or they can choose to wire up this new service instance with the schema of an old service instance which was deleted. This functionality can also be automated. At 403, the user creates a new SI.

Figure 5:
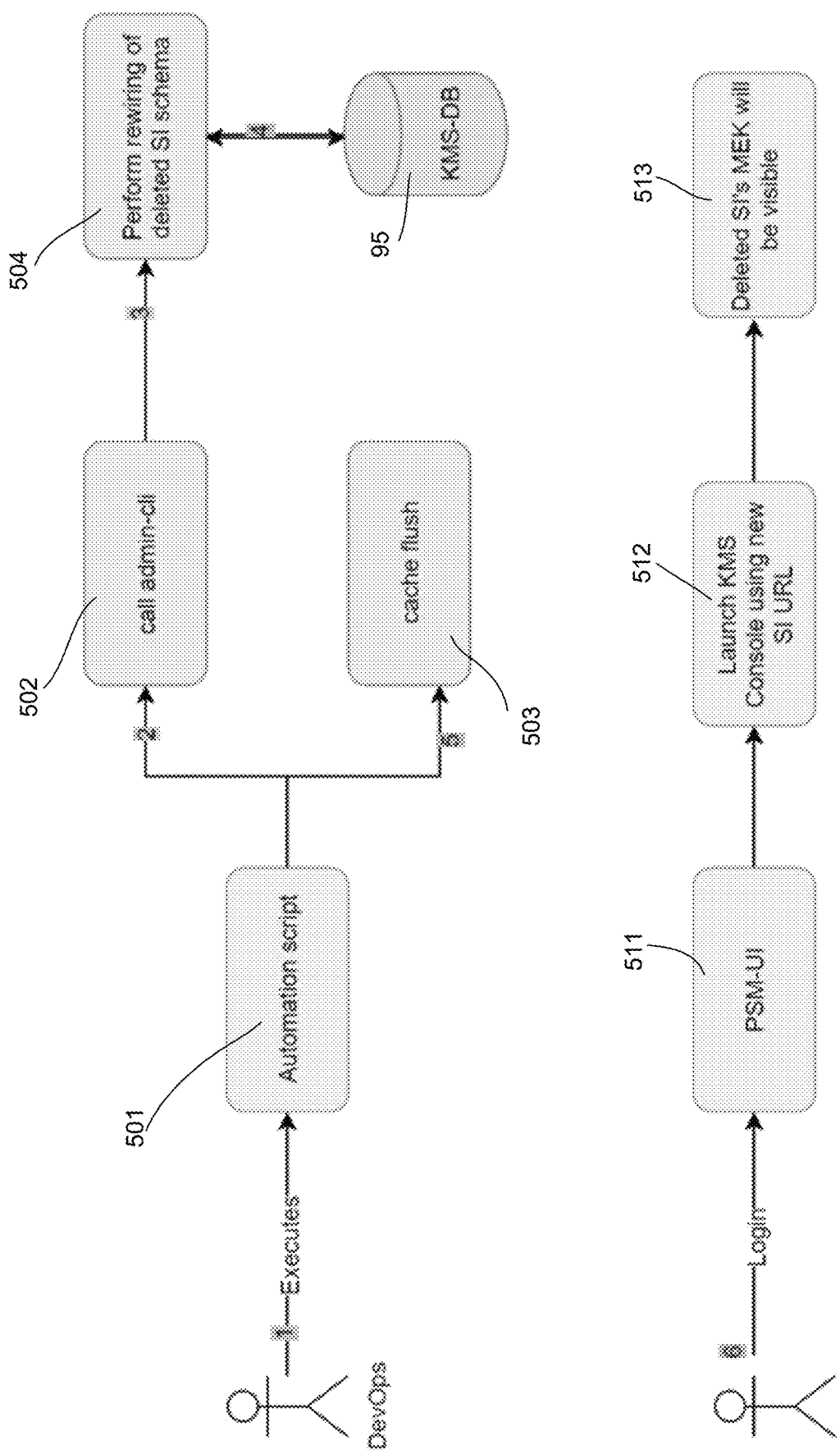
FIG. 5 is a flow diagram of functionality for rewiring a newly created service instance to deleted master encryption key(s) in accordance with an embodiment.

FIG. 5 is a flow diagram of functionality for rewiring a newly created SI to deleted MEK(s) in accordance with an embodiment. In embodiments, the functionality of FIG. 5 is implemented by KMS module 16 of FIG. 2 or by mid-tier 76 and data tier 92 of FIG. 1. The functionality of FIG. 5 would occur after the functionality of FIG. 4 in embodiments.

At 501, an automation script is executed. In one embodiment, a devops executes the automation script by logging into an admin node in the mid-tier using the "oracle" user role. In other embodiments, the automation script can be executed automatically. At 502, the automation script invokes the admin-cli with all the input parameters provided by devOps. Admin-cli is the command line interface which is executed in the admin node in the KMS mid-tier by a devOps engineer. The purpose of admin-cli is to accept the deleted SI name and newly created SI name from the command line and pass them to the automation process.

Pseudo-code in accordance to one embodiment of the pseudo-code is as follows:

```
# Script to rewire deleted SI with newly created SI.
setupenv_config( ) {
    // Set up boot-strap config for Automation
}
get_input( ) {
    // Get delete SI name and newly created SI name from command line
}
perform_rewire( ) {
    // Prepare for rewiring.
    // Construct rewire request
}
execute_rewire_cli( ) {
    //Pass deleted SI name and newly created SI name and invoke
    autorewire java service cli. [Refer fig.5 item 504]
}
flush_global_cache( ) {
    // After Successfully rewired then remove deleted SI referenced objects
    from global_cache
}
```

At 504, admin-cli will perform rewiring execution by causing the newly created SI to point to the deleted SI schema in database 95. At 503, the automation script does a selective cache flush on the dbSchemaMap object after successful rewiring. When the SI is deleted, its referenced SI data objects are removed (i.e., flushed) from the global cache.

At 511, the user accesses the PSM UI. At 512, the user launches the KMS console UI using the new SI URL from FIG. 3. At 513, the user can view the deleted SI MEKs, indicating that the MEKs are now available.

Figure 6A:
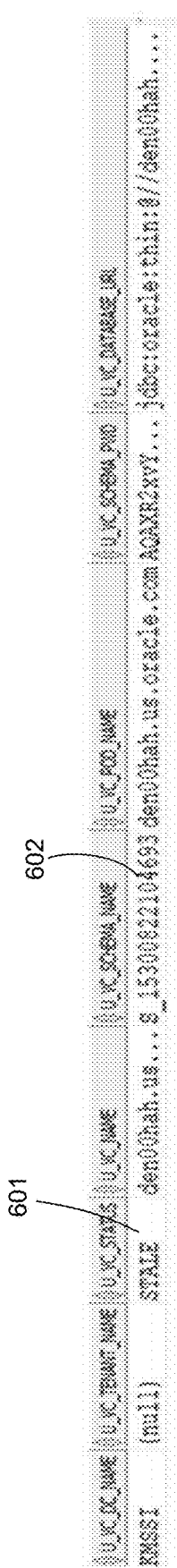
FIGS. 6A-C illustrate examples of service instances before and after rewiring of a DB SCHEMA MAP table in accordance with embodiments.
Figure 6B:
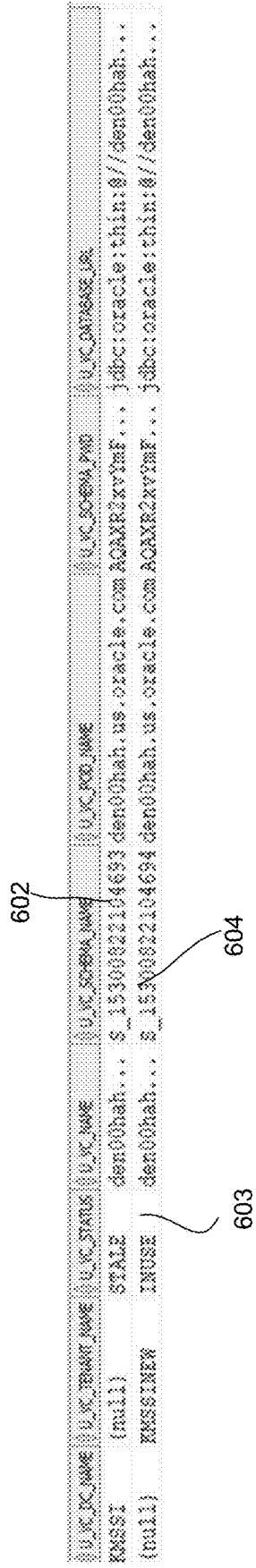
Figure 6C:
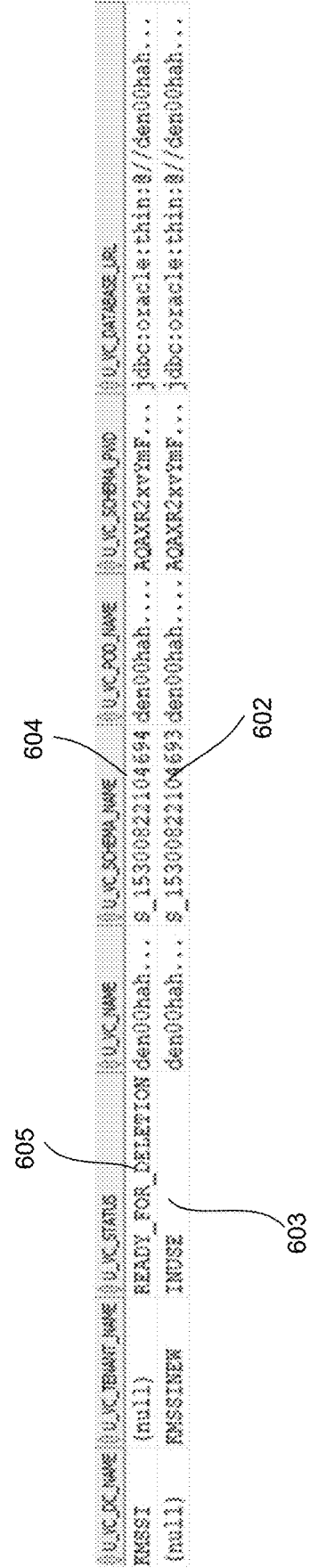

FIGS. 6A-C illustrate examples of service instances before and after rewiring of the DB SCHEMA MAP table in accordance with embodiments.

FIG. 6A illustrates the table before wiring—Status of deleted KMS SI in GLOBAL_KMS.DB_SCHEMA_MAP table (i.e., "stale" at 601) pointing to schema name 602 (i.e., ending with "693"). FIG. 6B illustrates the table after the new KMS SI is created (i.e., "inuse" at 603) pointing to schema name 604 (i.e., ending with "694"). FIG. 6C illustrates the expected status after the automation script is executed, showing the new SI 603 pointing (i.e., re-mapped) to the previous SI schema name 602, which is ready for deletion at 605.

Figure 7:
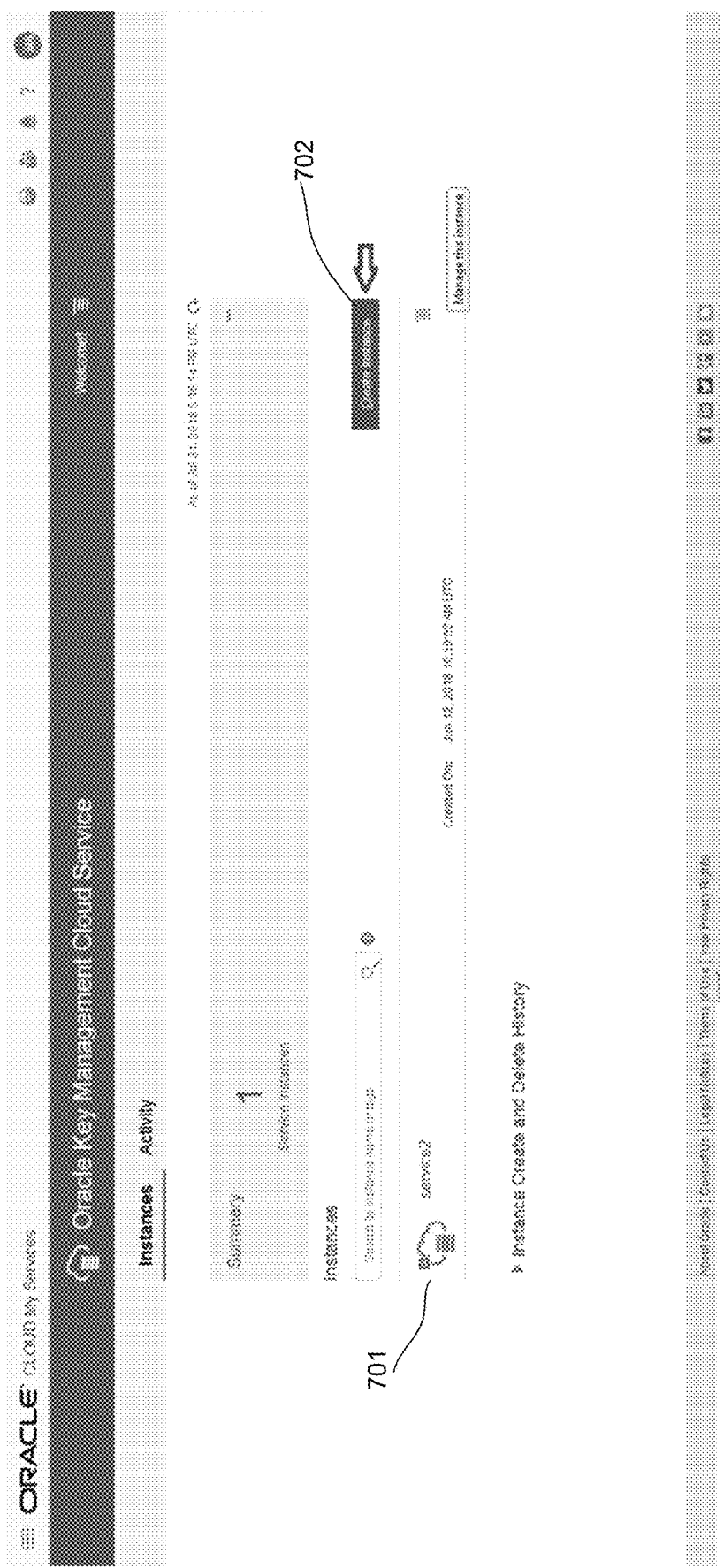
FIG. 7 is a screenshot of a PaaS Service Manager ("PSM") UI for managing a SI in accordance to embodiments.

FIG. 7 is a screenshot of a PSM UI for managing a SI in accordance to embodiments. Active service instances are shown at 701, and the user can select button 702 to create additional service instances.

Figure 8:
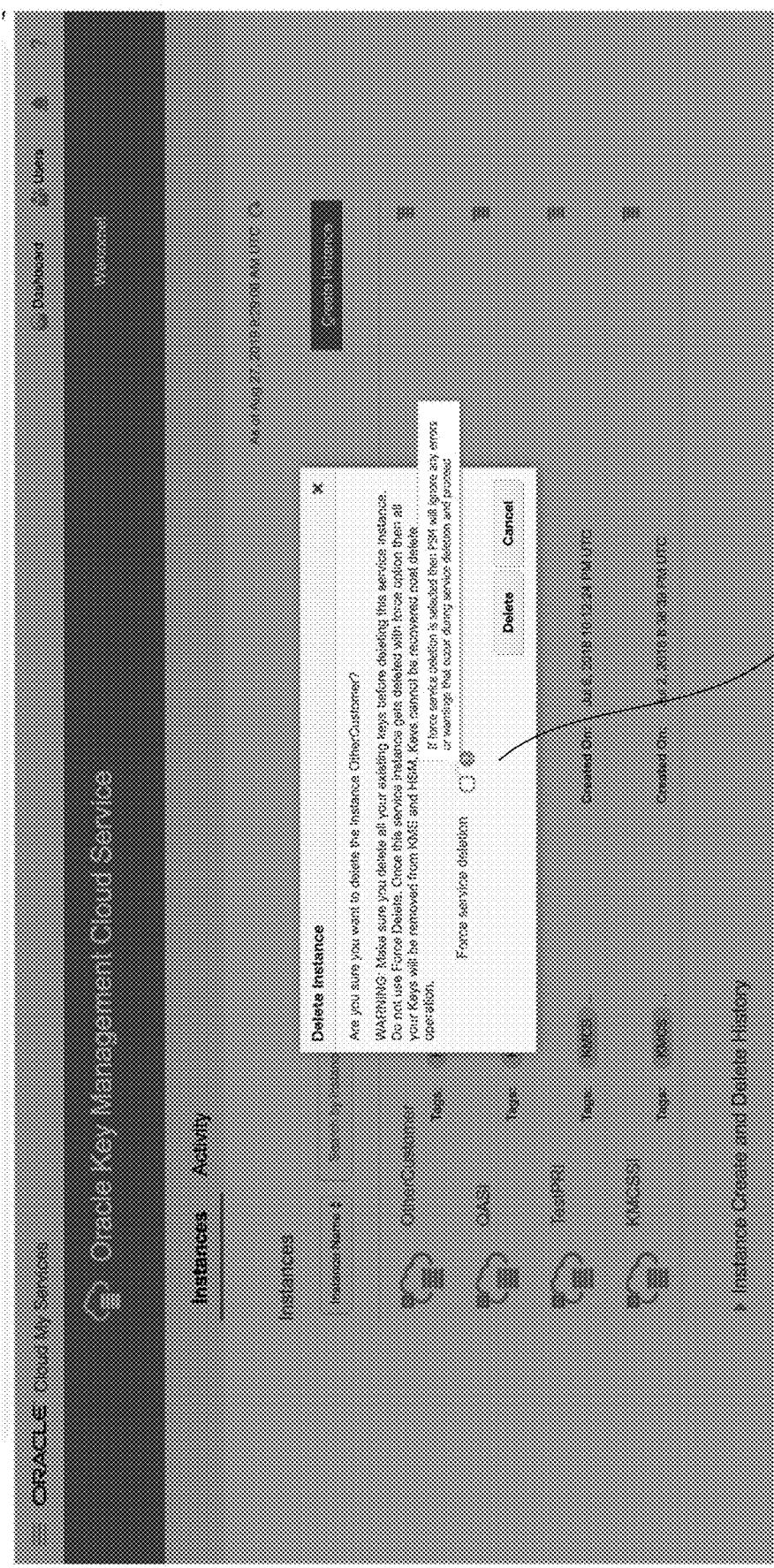
FIG. 8 is a screenshot of a PSM UI when force deleting an SI in accordance to embodiments.

FIG. 8 is a screenshot of a PSM UI when force deleting an SI in accordance to embodiments. At 801, a warning that includes a post delete checkbox is presented to the user per 303 of FIG. 3.

FIG. 9 is a screenshot of an SI Management Console that allows a user to manage keys in accordance to embodiments. Further, FIG. 9 is provided to the user in connection with 513 of FIG. 5 so that the user can view all of the previously "deleted" MEKs after the new SI has be rewired.

Figure 10:
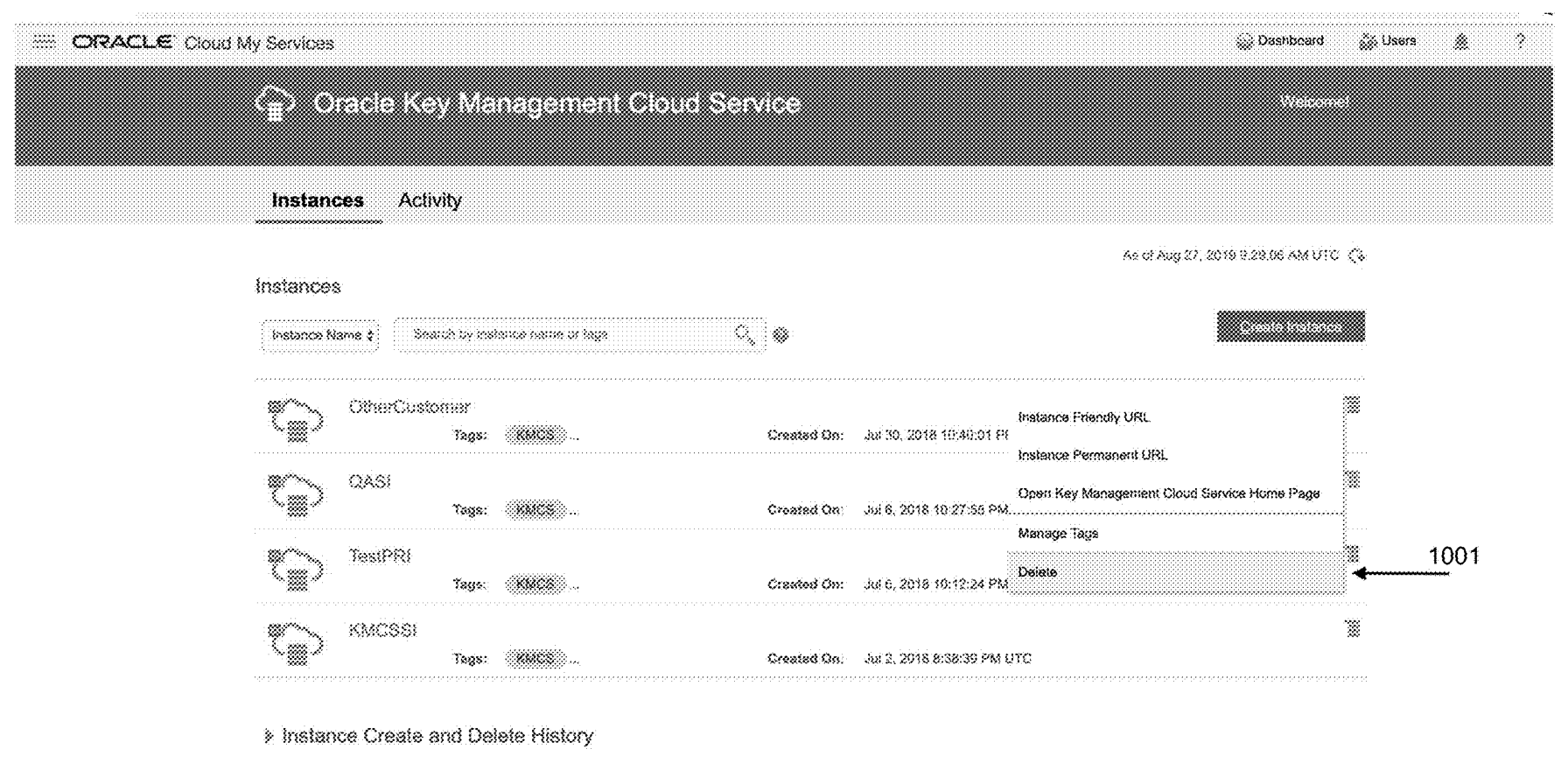

FIG. 10 is a screenshot of a PSM UI for creating or deleting a new service instance in accordance to embodiments. At 1001, a user can delete a selected service instance, as well as other options.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of rewiring a key management system (KMS) service instance (SI) with associated keys, the method comprising:

in response to a request, deleting a first SI corresponding to a user that is mapped to one or more keys, the one or more keys stored in the KMS, the first SI associated with a dedicated first database schema and comprising a first Application Programming Interface (API) that allows access to the one or more keys stored in the KMS, the deletion of the first SI causing the user to have no access to the one or more keys stored in the KMS, wherein the first SI is mapped to the first database schema and is associated with a uniform resource locator (URL) that allows the user to manage the keys;

creating a second SI associated with a dedicated second database schema comprising a second API; and mapping the second SI to the one or more keys, the mapping provider the user with access to the one or more keys stored in the KMS using the second API, wherein the mapping the second SI to the one or more keys comprises mapping the second SI to the second database schema.

2. The method of claim 1, wherein deleting the first SI causes access to the keys by the user to be deleted.

3. The method of claim 1, wherein the keys comprise master encryption keys (MEKs) and are stored in a hardware security module (HSM).

4. The method of claim 1, wherein in response to the deleting the first SI, the keys are deleted after an expiration of a predefined time period.

5. The method of claim 1, wherein the mapping is implemented by a mid-tier of the KMS, wherein the mid-tier is implemented by one or more microservices.

6. The method of claim 1, the deleting the first SI is in response to a prompt to verify a force deletion.

7. The method of claim 1, wherein the first database schema is deleted in response to the deleting the first SI, and the mapping the second SI to the second database schema comprises mapping the second SI to the deleted first database schema.

8. A key management system (KMS) comprising:
a mid-tier comprising one or more microservices; and
a data tier coupled to mid-tier and comprising one or more hardware security modules (HSMs) and one or more databases;
the mid-tier adapted to, in response to a first request, delete a first service instance (SI) corresponding to a user that is mapped to one or more keys, the one or more keys stored in the KMS, the first SI associated with a dedicated first database schema and comprising a first Application Programming Interface (API) that allows access to the one or more keys stored in the KMS, the deletion of the first SI causing the user to have no acces to the one or more keys stored in the KMS and, in response to a second request, create a second SI associated with a dedicated second database schema comprising a second API, and map the second SI to the one or more keys, the mapping providing the user with access to the one or more keys stored in the KMS using the second API;
wherein the first SI is mapped to the first database schema and is associated with a uniform resource locator (URL) that allows the user to manage the keys, and the mapping the second SI to the one or more keys comprises mapping the second SI to the second database schema.

9. The key management system of claim 8, wherein deleting the first SI causes access to the keys by the user to be deleted.

10. The key management system of claim 8, wherein the keys comprise master encryption keys (MEKs) and are stored in the HSMs.

11. The key management system of claim 8, wherein in response to the deleting the first SI, the keys are deleted after an expiration of a predefined time period.

12. The key management system of claim 8, the deleting the first SI is in response to a prompt to verify a force deletion.

13. The key management system of claim 8, wherein the first database schema is deleted in response to the deleting the first SI, and the mapping the second SI to the second database schema comprises mapping the second SI to the deleted first database schema.

14. A non-transitory computer readable medium having instructions stored thereon that, when executed by one or more processors, cause the processors to rewire a key management system (KMS) service instance (SI) with associated keys, the rewiring comprising:
in response to a request, deleting a first SI corresponding to a user that is mapped to one or more keys, the one or more keys stored in the KMS, the first SI associated with a dedicated first database schema and comprising a first Application Programming Interface (API) that allows access to the one or more keys stored in the KMS, the deletion of the first SI causing the user to have no access to the one or more keys stored in the KMS, wherein the first SI is mapped to the first database schema and is associated with a uniform resource locator (URL) that allows the user to manage the keys;
creating a second SI associated with a dedicated second database schema comprising a second API; and
mapping the second SI to the one or more keys, the mapping providing the user with access to the one or more keys stored in the KMS using the second API, wherein the mapping the second SI to the one or more keys comprises mapping the second SI to the second database schema.

15. The computer readable medium of claim 14, wherein deleting the first SI causes access to the keys by the user to be deleted.

16. The computer readable medium of claim 14, wherein the keys comprise master encryption keys (MEKs) and are stored in a hardware security module (HSM).

17. The computer readable medium of claim 14, wherein in response to the deleting the first SI, the keys are deleted after an expiration of a predefined time period.

18. The computer readable medium of claim 14, wherein the mapping is implemented by a mid-tier of the KMS, wherein the mid-tier is implemented by one or more microservices.

19. The computer readable medium of claim 14, the deleting the first SI is in response to a prompt to verify a force deletion.

20. The computer readable medium of claim 14, wherein the first database schema is deleted in response to the deleting the first SI, and the mapping the second SI to the second database schema comprises mapping the second SI to the deleted first database schema.

* * * * *

UNITED STATES PATENT AND TRADEMARK OFFICE
CERTIFICATE OF CORRECTION

| | |
|---|---|
| PATENT NO. | : 11,258,604 B2 |
| APPLICATION NO. | : 16/558625 |
| DATED | : February 22, 2022 |
| INVENTOR(S) | : Vats et al. |

It is certified that error appears in the above-identified patent and that said Letters Patent is hereby corrected as shown below:

In the Drawings

On sheet 8 of 10, in FIG. 8, under Reference Numeral 701, Line 1, delete "701" and insert -- 801 --, therefor.

In the Specification

In Column 3, Line 57, delete "objects" and insert -- objects. --, therefor.

In Column 7, Line 55, delete "fig.5" and insert -- Fig.5 --, therefor.

In the Claims

In Column 8, Line 61, in Claim 1, delete "provider" and insert -- providing --, therefor.

In Column 9, Line 30, in Claim 8, delete "acces" and insert -- access --, therefor.

Signed and Sealed this
Thirteenth Day of September, 2022

Katherine Kelly Vidal
*Director of the United States Patent and Trademark Office*